United States Patent
Moroishi et al.

(10) Patent No.: US 6,646,107 B2
(45) Date of Patent: Nov. 11, 2003

(54) PROCESS FOR PRODUCING POLYMER

(75) Inventors: Yutaka Moroishi, Osaka (JP);
Michiharu Yamamoto, Osaka (JP);
Tetsuo Inoue, Osaka (JP); Tomoko Doi, Osaka (JP); Masakazu Sugimoto, Osaka (JP); Fumiko Nakano, Osaka (JP)

(73) Assignee: Nitto Denko Corporation, Osaka (JP)

( * ) Notice: Subject to any disclaimer, the term of this patent is extended or adjusted under 35 U.S.C. 154(b) by 200 days.

(21) Appl. No.: 09/799,500

(22) Filed: Mar. 7, 2001

(65) Prior Publication Data

US 2001/0027245 A1 Oct. 4, 2001

(30) Foreign Application Priority Data

| Mar. 7, 2000 | (JP) | 2000-067175 |
| Jul. 6, 2000 | (JP) | 2000-204613 |
| Jan. 12, 2001 | (JP) | 2001-005690 |

(51) Int. Cl.$^7$ .................................................. C08F 6/00
(52) U.S. Cl. ............... 528/502 D; 528/482; 528/502 R; 528/502 A; 526/135; 526/172; 525/94; 525/299
(58) Field of Search .................... 528/482, 502 A, 528/502 D, 502 R; 526/135, 172; 525/94, 299

(56) References Cited

U.S. PATENT DOCUMENTS

| 5,763,548 A | 6/1998 | Matyjaszewski et al. |
| 5,807,937 A | 9/1998 | Matyjaszewski et al. |
| 6,121,371 A * | 9/2000 | Matyjaszewski et al. ........ 526/172 X |
| 6,121,380 A | 9/2000 | McGinnis et al. ........ 525/123 |
| 6,432,475 B1 * | 8/2002 | Yamamoto et al. ..... 526/147 X |

FOREIGN PATENT DOCUMENTS

| DE | 196 02 540 A1 | 7/1997 |
| JP | A-11-193307 | 7/1999 |
| WO | WO 99/50310 | 10/1999 |

OTHER PUBLICATIONS

Schwartz et al, Plastics Materials and Processes, 1982, Van Nostrand Reinhold, Inc., N.Y., p. 506.*
European Search Report dated Jul. 12, 2001.

* cited by examiner

Primary Examiner—Fred Teskin
(74) Attorney, Agent, or Firm—Sughrue Mion, PLLC

(57) ABSTRACT

The object of the present invention is to produce a polymer, which is free from the troubles of the coloration and the decrease in the mechanical properties of molded articles (films, etc.), crosslinkage failure, migration (stain) or the like, by the living radical polymerization method wherein the content of impurities consisting of a transition metal and its ligand employed as a polymerization activator is reduced. A process for producing a polymer is described, comprising: a) the step of performing a polymerization reaction by using a monomer, a transition metal and its ligand and a polymerization initiator to form a polymer; and b) the step of eliminating the transition metal and its ligand contained in the polymer under the condition of a viscosity of 100 Pa·s or below, wherein the step b comprises: b1) the former step of eliminating the transition metal and its ligand insoluble in the polymer; and b2) the latter step of eliminating the transition metal and its ligand dissolved in the polymer.

13 Claims, No Drawings

PROCESS FOR PRODUCING POLYMER

FIELD OF THE INVENTION

This invention relates to a process for producing a polymer (in particular, a block copolymer) which is contaminated with little impurities and usable as a base polymer in the fields of films, adhesives, pressure-sensitive adhesives, molded articles, surface-coating agents, coatings and the like, additive components such as compatibilizing agents, softeners, dispersants and tackifier resins, mold release agents and release agents (or backside treatment agents).

BACKGROUND OF THE INVENTION

It has been a practice to use various polymers, which are produced by radical polymerization, ionic polymerization and polycondensation reactions, for various purposes including a base polymer in the fields of films, adhesives, pressure-sensitive adhesives, molded articles, surface-coating agents, coatings and the like, additive components such as compatibilizing agents, softeners, dispersants and tackifier resins.

Among the polymerization methods as described above, the radical polymerization method has been widely utilized industrially. This is because this method is applicable to various types of monomers and less restricted in operation (i.e., the polymerization procedure should be performed in an inert gas such as nitrogen but it is unnecessary to control moisture, etc. in this method). Recently, a technique of living radical polymerization method, which falls within the category of the radical polymerization method, is developed. In this method wherein a monomer is polymerized by using a polymerization initiator in the presence of a transition metal and its ligand, the molecular weight and molecular weight distribution of the polymer can be more accurately controlled than in the usual radical polymerization method. In addition, a block copolymer can be synthesized thereby.

Accordingly, attempts have been made in various fields to control the block structure or functional groups of copolymers by the living radical polymerization method as described above so as to improve the properties thereof. In JP-A-11-236428, for example, it is discussed to improve the overall properties of pressure-sensitive adhesives by changing the compositions or molecular weights of copolymers and thus controlling the balance among adhesion, tackiness and holding power. On the other hand, JP-A-2000-72815 proposes materials which are modified by introducing acryloyl group into the terminal and thus can be cured by light irradiation or electron radiation. (The term "JP-A" as used herein means an "unexamined published Japanese patent application".)

In the living radical polymerization method as described above, however, a transition metal and its ligand employed as a polymerization activator remain in the polymer. Even though the polymer has been homogenized by filtration or the like, the transition metal and its ligand dissolved in the polymer still remain therein in a large amount as impurities and thus cause troubles, for example, the coloration of molded articles such as films and the decrease in the mechanical properties of molded articles such as films. Moreover, there sometimes arise additional problems that, in case of crosslinking this polymer, the above-described impurities inhibit the crosslinking reaction and thus the crosslinkage cannot proceed well, or in case of using the polymer as a coat material such as an adhesive or a coating, these impurities migrate onto the surface of an adherend and thus cause the stain of the adherend.

JP-W-10-509475 discloses a process for producing a polymer comprising the step of performing atom- or group-transfer radical polymerization by using a transition metal and its ligand, and the step of isolating the thus formed polymer. In this process, the polymer is precipitated from an appropriate solvent, filtered and washed in the isolation step thereof. Therefore, there arise some problems, for example, need of a large amount of the solvent and complicated procedures and a decrease in the yield of the polymer. (The term "JP-W" as used herein means an "unexamined published International patent application".)

SUMMARY OF THE INVENTION

Under these circumstances, the invention aims at, in producing a polymer by the living radical polymerization method, reduce the amount of impurities consisting of a transition metal and its ligand employed as a polymerization activator to thereby give a polymer which is free from any problems such as the coloration or the decrease in the mechanical properties of molded articles such as films, crosslinkage failure or migration.

To achieve the object as described above, the inventors have conducted intensive studies and consequently found out that the content of a transition metal and its ligand, which are employed as a polymerization activator, in a polymer can be surely reduced and thus a polymer which is free from any problems such as the use of a large amount of the solvent, the remarkable decrease in the yield of the polymer, the coloration or the decrease in the mechanical properties of molded articles such as films, crosslinkage failure or migration can be easily produced by, after the completion of the formation of the polymer by the living radical polymerization method, eliminating the transition metal and its ligand which are employed as a polymerization activator, contained in the polymer while regulating the viscosity of the polymerization reaction mixture product to a definite level or below, and carrying out the elimination in two steps comprising the former step of eliminating the transition metal and its ligand insoluble in the polymer and the latter step of eliminating the transition metal and its ligand dissolved in the polymer (in particular, using a centrifuge and an ion exchange resin respectively in the former step and in the latter step), thereby completing the invention.

Accordingly, the invention relates to a process for producing a polymer comprising: a) the step of performing a polymerization reaction by using a monomer, a transition metal and its ligand and a polymerization initiator to form a polymer; and b) the step of eliminating the transition metal and its ligand contained in the polymer under the condition of a viscosity of 100 Pa·s or below, characterized in that the step b comprises: b1) the former step of eliminating the transition metal and its ligand insoluble in the polymer; and b2) the latter step of eliminating the transition metal and its ligand dissolved in the polymer. In particular, the invention relates to a process which further comprises c) the step of eliminating the unreacted monomer after the step a, in addition to the step b, and a process wherein the combination of the transition metal and its ligand is a $Cu^{+1}$-bipyridine complex.

The invention further relates to the process for producing a polymer as described above wherein the step b1 comprises the step of eliminating the transition metal and its ligand insoluble in the polymer by using a centrifuge; the process for producing a polymer as described above wherein the step b2 comprises the step of eliminating the transition metal and its ligand dissolved in the polymer with the use of an ion exchange resin; the process for producing a polymer as described above wherein no solvent is employed in any step; the process for producing a polymer as described above wherein the content of the transition metal and its ligand in the polymer is regulated to 30 ppm or below; the process for producing a polymer as described above wherein the number-average molecular weight of the polymer ranges from 3,000 to 300,000; and the process for producing a polymer as described above wherein the polymer is a block copolymer of the A-B type, the A-B-A type, the A-B-C type or the like.

The invention further relates to the process for producing a polymer as described above wherein the polymer is a block copolymer being tacky at room temperature which is composed of at least two blocks of a non-elastomeric polymer block A having a glass transition temperature of 20° C. or above and an elastomeric polymer block B comprising a (meth)acrylate polymer bonded thereto. The invention furthermore relates to a pressure-sensitive adhesive composition characterized by comprising, as the main component, a block copolymer being tacky at room temperature, which is produced by the process as described above, of the A-B type, the A-B-A type or the B-A-B type.

Moreover, the invention relates to the process for producing a polymer as described above wherein the polymer is a block copolymer composed of at least two blocks of a polymer block A having a glass transition temperature of 0° C. or above and a (meth)acrylate polymer block B having a glass transition temperature of lower than 0° C. bonded thereto. The invention further relates to a film-forming material characterized by comprising, as the main component, a block copolymer, which is produced by the process as described above, of the A-B type, the A-B-A type or the B-A-B type; and a coating composition characterized by comprising the same as the main component.

DETAILED DESCRIPTION OF THE INVENTION

As the step a in the invention, a polymerization reaction is first performed by using a monomer, a transition metal and its ligand as a polymerization activator and a polymerization initiator (i.e., the living radical polymerization method) to thereby form a polymer. As the monomer as described above, use can be made of various monomers such as styrene monomers, (meth)acrylate monomers and vinyl monomers. The polymer thus formed may be either a homopolymer obtained by using one of the above-described monomers alone or a copolymer obtained by using two or more monomers. In case of a copolymer, not only a random copolymer but also a block copolymer, which can be hardly synthesized by the conventional radical polymerization method, can be formed.

To produce such a block copolymer, for example, a monomer A is polymerized and then another polymer B is added when the conversion of the monomer A attains at least 50% by weight (usually at least 80% by weight and preferably at least 90% by weight). Then the polymerization is continued to thereby give a block copolymer of the A-B type composed of a polymer block A and a polymer block B. Also, a block copolymer of the A-B-A type can be synthesized by when the conversion of the above-described monomer B attains at least 50% by weight (usually at least 80% by weight and preferably at least 90% by weight), further adding the monomer A and continuing the polymerization reaction. It is also possible to synthesize a block copolymer of the A-B-C type composed of a polymer block A, a polymer block B and a polymer block C by using another monomer C differing in properties from the monomers A and B and successively polymerizing these monomers as in the above case.

Such a block copolymer may have a block structure appropriate for the use. In case of using in a pressure-sensitive adhesive composition, it is particularly favorable to form a block copolymer being tacky at room temperature which is composed of at least two blocks of a non-elastomeric polymer block A having a glass transition temperature (hereinafter referred to as Tg) of 20° C. or above and an elastomeric polymer block B comprising a (meth) acrylate polymer bonded thereto, in particular, a block copolymer of the A-B type, the A-B-A type or the B-A-B type. In case of using in a film-forming material or a coating composition, it is favorable to form a block copolymer composed of at least two blocks of a polymer block A having a Tg of 0° C. or above and a (meth)acrylate polymer block B having a Tg of lower than 0° C. bonded thereto, in particular, a block copolymer of the A-B type, the A-B-A type or the B-A-B type.

Examples of transition metal to be used as a polymerization activator include Cu, Ru, Fe, Rh, V and Ni. In general, halides (chlorides, bromides, etc.) of these metals are employed. As the ligand, it is favorable to use those which are coordinated to the central atom of such a transition metal, for example, bipyridine derivatives, mercaptan derivatives, trifluorate derivatives and amine derivatives. Among these combinations of transition metals with ligands thereof, it is preferable to use a $Cu^{+1}$-bipyridine complex from the viewpoints of polymerization stability and polymerization speed.

As the polymerization initiator, ester or styrene derivatives having a halogen at the α-position are favorable. It is particularly preferable to use 2-bromo (or chloro)-propionic acid derivatives or 1-phenyl chloride (or bromide) derivatives. Particular examples thereof include halogenated compounds such as methyl 2-bromo(or chloro)-propionate, ethyl 2-bromo(or chloro)-propionate, methyl 2-bromo(or chloro)-2-methylpropionate, ethyl 2-bromo(or chloro)-2-methylpropionate and 1-phenylethyl chloride (or bromide).

The monomer to be polymerized may be appropriately selected depending on the use of the polymer product, the polymer structure (for example, a block copolymer), etc. In case of using the polymer as a base polymer of a pressure-sensitive adhesive composition, use is made of a monomer containing a (meth)acrylate monomer as an essential component. The (meth)acrylate monomer as described above contains a (meth)acrylate represented by the general formula (1): $CH_2=CR^1COOR^2$ (wherein $R^1$ represents a hydrogen atom or a methyl group, and $R^2$ represents an alkyl group having from 2 to 14 carbon atoms) as the main component. Among all, it is particularly preferable to use (meth) acrylates having an alkyl group having from 4 to 12 carbon atoms such as n-butyl (meth)acrylate, 2-ethylhexyl (meth) acrylate, isooctyl (meth)acrylate and isononyl (meth) acrylate.

The (meth)acrylate monomer may contain the main monomer as described above together with a modifier monomer copolymerizable therewith in an amount of 40% by weight or less (preferably 30% by weight or less and still preferably 20% by weight or less) on the basis of the whole (meth)acrylate monomer. Examples of the modifier monomer include (meth)acrylamide, mono- and diesters of maleic acid, glycidyl (meth)acrylate, N,N-dimetylaminoethyl (meth)acrylate, N,N-dimethylaminopropyl (meth)acrylate, N-vinylpyrrolidone, acrylonitrile and (meth)acryloyl morpholine.

To produce a homopolymer to be used as a base polymer in a pressure-sensitive adhesive composition, one of the (meth)acrylates represented by the above general formula (1) which is employed as the main monomer, maybe polymerized alone. To produce a random copolymer among copolymers, two or more (meth)acrylate monomers may be selected from among the (meth)acrylate monomers containing the above-described main monomer and this monomer mixture is subjected to polymerization at the same time.

To produce a block copolymer which can be hardly synthesized by the conventional radical polymerization method, it is desirable to form a block copolymer being tacky at room temperature, which is composed of at least two blocks of a non-elastomeric polymer block A having a glass transition temperature of 20° C. or above and an elastomeric polymer block B comprising a (meth)acrylate polymer bonded thereto as described above, by using the above-described (meth)acrylate monomer together with another monomer capable of imparting a non-elastomeric polymer having a Tg of 20° C. or above and polymerizing these monomers in an adequate order. Thus, it is possible to achieve very excellent adhesion properties with highly satisfactory adhesion and cohesion.

To improve the cohesive properties and heat resistance of the pressure-sensitive adhesive, use is made, as the monomer capable of imparting a non-elastomeric polymer, of a monomer capable of imparting a polymer having a Tg of 20° C. or above, preferably from 60 to 160° C. In typical case, it is preferable to use styrene monomers such as styrene, α-methylstyrene, 2,4-dimethylstyrene and 4-methoxystyrene. However, any monomer capable of imparting a non-elastomeric polymer may be used therefor without restriction. For example, use may be made of monomers such as isobornyl acrylate and dicyclopentanyl acrylate.

In case of forming a block copolymer by using such a monomer (for example, a styrene monomer), a block copolymer of the A-B type (including the B-A type) can be obtained by successively polymerizing the styrene monomer and a (meth)acrylate monomer. A block copolymer of the A-B-A type can be obtained by first polymerizing the styrene monomer, then adding and polymerizing the (meth)acrylate monomer, and adding and polymerizing the styrene monomer again. On the contrary, a block copolymer of the B-A-B type can be obtained by first polymerizing the (meth)acrylate monomer, then adding and polymerizing the styrene monomer, and adding and polymerizing the (meth)acrylate monomer again. In such polymerization, it is advantageous to add the latter monomer when the conversion of the former monomer attains at least 50% by weight (usually at least 80% by weight and preferably at least 90% by weight).

It is desirable that the block copolymer thus constituted is a block copolymer of the A-B type, the A-B-A type or the B-A-B type as described above. In such a block copolymer, the content of the non-elastomeric polymer block A having a Tg of 20° C. or above composed of a styrene polymer or the like ranges from 5 to 50% by weight, preferably from 10 to 40% by weight and still preferably from 15 to 30% by weight, based on the whole block copolymer. When the content of the non-elastomeric polymer block A is excessively large, the obtained polymer is too hard and fails to establish the viscoelastic properties required in a pressure-sensitive adhesive composition. When the content is excessively small, on the other hand, the cohesive properties required in a pressure-sensitive adhesive composition are worsened in many cases.

In case of using the polymer as a base polymer in a film-forming material or a coating composition, it is desirable that use is made of a monomer capable of imparting a polymer having a Tg of 0° C. or above (preferably 20° C. or above) and a (meth)acrylate monomer capable of imparting a polymer having a Tg of lower than 0° C. (preferably lower than −10° C.) and these monomers are polymerized in an adequate order, thereby forming a block copolymer composed of at least two blocks of a polymer block A having a glass transition temperature of 0° C. or above and a (meth) acrylate polymer block B having a glass transition temperature of lower than 0° C. bonded thereto as described above.

As the above-described monomer capable of imparting a polymer having a Tg of 0° C. or above, use may be made of styrene monomers (styrene or derivatives thereof), methyl methacrylate, isobornyl acrylate, dicyclopentanyl acrylate, etc. As the above-described (meth)acrylate monomer capable of imparting a polymer having a Tg of lower than 0° C., use may be made of the same ones as in the case of using as a base polymer of a pressure-sensitive adhesive. Namely, use may be made of those containing the (meth)acrylate represented by the general formula (1) as described above as the main component optionally together with a modifying monomer copolymerizable therewith (for example, (meth) acrylamide, (meth)acrylonitrile, mono- or diesters of maleic acid) usually in an amount of 40% by weight or less.

In case of forming a block copolymer by using such a monomer (for example, a styrene monomer), a block copolymer of the A-B type (including the B-A type) can be obtained by successively polymerizing the styrene monomer and a (meth)acrylate monomer. A block copolymer of the A-B-A type can be obtained by first polymerizing the styrene monomer, then adding and polymerizing the (meth) acrylate monomer, and adding and polymerizing the styrene monomer again. On the contrary, a block copolymer of the B-A-B type can be obtained by first polymerizing the (meth)acrylate monomer, then adding and polymerizing the styrene monomer, and adding and polymerizing the (meth) acrylate monomer again. In such polymerization, it is advantageous to add the latter monomer when the conversion of the former monomer attains at least 50% by weight (usually at least 80% by weight and preferably at least 90% by weight).

It is desirable that the block copolymer thus constituted is a block copolymer of the A-B type, the A-B-A type or the B-A-B type as described above. Alternatively, the above-described monomers may be polymerized in a different order to form arbitrary block copolymers of the A-B-A-B type, the A-B-A-B-A type, the B-A-B-A-B type and the like. It is also possible to combine another monomer having different in polymer properties from a styrene monomer or the like to form block copolymers of the A-B-C type and the like.

In the living radical polymerization as described above, the polymerization initiator is used generally in an amount of 0.01 to 10% by mol, preferably 0.1 to 5% by mol, based on the total monomers (i.e., referring the total amount of the monomers as to 100% by mol). The transition metal is used in the form of a halide, etc. generally in an amount of from 0.01 to 3 mol, preferably from 0.1 to 1 mol, per mol of the above-described polymerization initiator. The ligand of the transition metal is used generally in an amount of form 1 to 5 mol, preferably form 1.5 to 3 mol, per mol of the above-described transition metal (in the form of a halide, etc.). By controlling the contents of these components each to the level as defined above, favorable results can be achieved in the polymerization reactivity, the molecular weight of the polymer product, etc.

The living radical polymerization may be carried out either without using any solvent (i.e., solvent-free) or in the presence of a solvent such as butyl acetate, toluene or xylene. In case of using a solvent, it is advantageous to control the amount of the solvent to such a low level as to give a solvent concentration of 50% by weight or below after the completion of the polymerization in practice so as to prevent a decrease in the rate of polymerization. Even though no or little solvent is used, there arises no problem in safety (for example, controlling of polymerization heat). Reduction of a solvent rather brings about favorable results in cost and environmental protection. Regarding the polymerization conditions, the polymerization is controlled to 70 to 130° C. by taking the rate of polymerization and the inactivation of the catalyst into consideration, while the polymerization time is controlled to about 1 to 100 hours, though it varies depending on the final molecular weight and the polymerization temperature.

It is preferable that the polymer thus obtained has a number-average molecular weight of from 3,000 to 300,000. In case of using as a base polymer of a pressure-sensitive adhesive, a film-forming material, a coating, etc., it is particularly preferable that the number-average molecular weight ranges from 30,000 to 200,000. In case of using as an additive, it is preferable that the number-average molecular weight ranges from 5,000 to 50,000. When the number-average molecular weight of the polymer is less than 3,000, the cohesive properties are worsened. When the number-average molecular weight exceeds 300,000, the working properties (application properties, etc.) of the polymer are worsened because of the excessively high viscosity thereof.

The number-average molecular weight as described above is a value which can be determined by the GPC (gel permeation chromatography) method in terms of styrene. It is known that the number-average molecular weight (Mn) of a polymer is calculated as follows:

Mn (theoretical value)=[(molecular weight of monomer)× (molar ratio of monomer)]/(molar ratio of polymerization initiator). Accordingly, it is theoretically possible to intentionally regulate the number-average molecular weight of the polymer by appropriately controlling the feeding ratio of the monomer and the polymerization initiator employed.

In the invention, the above-described polymer can be used as such after eliminating the solvent, etc. Alternatively, it maybe crosslinked so as to elevate the strength of the molded article or improve the heat resistance or solvent resistance thereof. The crosslinkage may be performed by forming radicals due to the radiation with electron ray, γ-ray, etc., or by forming radicals with the use of a photoinitiator or a heat initiator. It is particularly preferable to employ a chemical crosslinking method with the use of a functional group. In this chemical crosslinking method with the use of functional group, it is desirable that an appropriate functional group (in particular, hydroxyl group) has been preliminarily introduced into the polymer as described above. Such a polymer having hydroxyl group can be easily formed by using a polymerization initiator having hydroxyl group as a polymerization inhibitor, by using a monomer having hydroxyl group as one of the monomers, or by combining these materials, in the living radical polymerization as described above.

By using a polymerization initiator having hydroxyl group, the above-described hydroxyl group can be introduced into the initiation end of the polymer. As such a polymerization initiator, it is preferable to use a compound which is an ester or styrene derivative having a halogen (bromine or chlorine) at the α-position and hydroxyl group in its molecule. More particularly speaking, use can be made therefor of halogenated compounds such as 2-hydroxyethyl 2-bromo(or chloro)-propionate, 4-hydroxybutyl 2-bromo(or chloro)-propionate, 2-hydroxyethyl 2-bromo(or chloro)-2-methylpropionate and 4-hydroxybutyl 2-bromo(or chloro)-2-methylpropionate.

By using a monomer having hydroxyl group, the hydroxyl group can be introduced at an arbitrary position of the polymer chain depending on the addition timing. As such a monomer use may be made of (meth)acrylates having hydroxyalkyl groups having from 2 to 6 carbon atoms. Particular examples thereof include 2-hydroxyethyl (meth)acrylate, 3-hydroxypropyl (meth)acrylate, 4-hydroxybutyl (meth)acrylate and 6-hydroxyhexyl (meth)acrylate. It is preferable that the content of such a monomer having hydroxyl group is controlled to 10% by weight or less (preferably 5% by weight or less) of the total monomers so as to avoid the deterioration in the properties of the polymer.

In case where a polymerization initiator having hydroxyl group is used together with a monomer having hydroxyl group and the monomer having hydroxyl group is added in the latter stage of the polymerization, for example, when the above-described block copolymer is formed, this monomer is added when the conversion of the monomer attains 80% by weight or above in the final step of the formation of the polymer blocks. Thus, the hydroxyl group of the above-described monomer can be introduced into the termination end of the polymer chain. Since the polymer has another hydroxyl group originating in the polymerization initiator at the initiation end of the polymer chain, two or more hydroxyl groups can be thus telechelically introduced. When two or more hydroxyl groups are telechelically introduced into the polymer chain as in this case, the polymer can be linearly extended due to the crosslinkage with the use of these hydroxyl groups. Thus, a uniform crosslinked product with little variance in the distance among crosslinkages can be formed and, in its turn, a crosslinked polymer capable of exhibiting improved properties can be obtained.

In the invention, the polymer thus formed by the living radical polymerization is contaminated with a large amount of the transition metal and its ligand which are employed as a polymerization activator and remain as impurities. In case where the transition metal is copper, there arise some problems such as the coloration of molded articles (films, etc.) which worsens the transparency and causes troubles in coloring into other colors, the decrease in the mechanical properties, and troubles in using for electrical or electronic purposes. When such a polymer is subjected to a crosslinking treatment, moreover, the crosslinking reaction cannot smoothly proceed due to the interference from the above-described impurities and thus the physical properties of the polymer are worsened. In case of using the polymer as a coat material of an adhesive or a coating, there arises another problem that the above-described impurities migrate onto the surface of an adherend and thus cause the stain of the adherend.

To avoid these problems, the process according to the invention is characterized in that the transition metal and its ligand contained in the polymer formed in the above-described step a are eliminated under the condition of a viscosity of 100 Pa·s or below, that is, under the condition that the polymer has fluidity. It is further characterized in that this elimination is carried out in the former step (i.e., the step b1) of eliminating the transition metal and its ligand insoluble in the polymer, and the latter step (i.e., the step b2) of eliminating the transition metal and its ligand dissolved in the polymer.

In case where the polymer product is diluted with a solvent in the above-described step b1, the polymer can be usually fluidized to establish a viscosity of 10 Pa·s or below. Therefore, the insoluble transition metal and its ligand not dissolved in the solution are eliminated in this state by filtration or centrifugation. In case of using no solvent, the polymer has a high viscosity and poor in fluidity at room temperature. Thus, it is heated so as to lower the viscosity to 100 Pa·s or below and then the transition metal and its ligand insoluble in the polymer are eliminated in this state. Although the elimination is carried out by filtration or centrifugation, it is preferable to use a centrifuge. This is because the filtration procedure is inadequate for the treatment on a mass scale, since filter paper frequently undergoes clogging and thus the feeding pressure is elevated.

As the centrifuge, it is preferable to employ a centrifuge having centrifuge tubes provided with a heating unit or a continuous centrifuge provided with a system whereby a heated polymer can be supplied. It is particularly preferable industrially to employ a centrifuge provided with a system whereby the precipitated transition metal and its ligand can be automatically discharged. The treating conditions with the use of such a centrifuge may be determined depending on the type of the polymer and the viscosity at the treatment. In general, a centrifugal force of from 5,000 to 20,000 g is needed and the treatment time ranges from several minutes to several hours. The centrifugal force is reduced and the treatment time is shortened with a decrease in the molecular weight or with an increase in the temperature.

In the above-described step b2, the transition metal and its ligand dissolved in the polymer are eliminated after the step b1 as described above. In this elimination, an ion exchange resin is usually employed. As the ion exchange resin, it is favorable to use a sulfonic acid-type ion exchange resin which is a cation-type ion exchange resin capable of absorbing the transition metal and its ligand and expected as achieving a high absorption speed even though employed in a small amount. In case where the treatment with the ion exchange resin is performed in a fluidized state at a viscosity of 100 Pa·s or below by diluting with a solvent, the ion exchange resin should have a solvent resistance. In case of heating to impart fluidity, it should be resistance to heat.

As an ion exchange resin satisfying these requirements (i.e., being highly resistant to solvents and heat), it is necessary to select a resin having a high degree of crosslinkage. Among marketed products, it is favorable to use "Diaion" manufactured by Mitsubishi Chemical Corporation, "Amberlite" manufactured by Rohm & Hass Co., "Lewatit" manufactured by Bayer AG, "Dowex" manufactured by Dow Chemical Co., "Indion" manufactured by Ion Exchange Co., and the like.

In case of a solution prepared by diluting the polymer with a solvent, this treatment with an ion exchange resin is carried out by adding the ion exchange resin to the above-described solution, then stirring the mixture and eliminating the ion exchange resin. Alternatively, the above-described solution is passed through a column packed with the ion exchange resin so that the transition metal and its ligand dissolved in the polymer are eliminated via adsorption. In case of using no solvent, the polymer is fluidized by heating so as to control the viscosity to 100 Pa·s or below. Then the ion exchange resin is added to the fluidized polymer and the mixture is stirred followed by the elimination of the ion exchange resin. Alternatively, the polymer is introduced into an ion exchange resin column provided with a heating unit and then the transition metal and its ligand dissolved in the polymer are eliminated via adsorption. Regardless of the use of a solvent, it is favorable to employ a continuous system (for example, using an ion exchange resin column) form the viewpoint of productivity.

By dividing the elimination procedure as the step b into the two steps as described above (i.e., the former step b1 and the latter step b2), the solvent may be used only in a small amount even in case where the polymer is diluted with the solvent. That is to say, the amounts of the transition metal and its ligand contained as impurities in the polymer can be easily reduced each to 30 ppm or below (preferably 10 ppm or below, usually to 0.1 ppm) without using a large amount of an organic solvent as in the conventional cases. Moreover, there is no fear of considerably lowering the yield of the polymer. Namely, all of the problems as described above can be solved thereby. To reduce the contents of the above-described impurities as described above, it is also possible, if necessary, to use the above-described ion exchange resin together with another adsorbent typified by zeolite or alumina gel in the above-described step b2 as an auxiliary means of eliminating the above-described impurities by adsorption.

In the invention, use may be made of another step c of eliminating the unreacted monomer contained in the polymer formed in the step a, in addition to the step b. Although the monomer can be almost completely polymerized in the step a, complete polymerization is impossible in the case of some monomers and thus such a monomer remains in the unreacted state. Since the presence of the unreacted monomer, even in a small amount, sometimes causes problems such as an offensive odor, it is desired to eliminate the unreacted monomer. It is preferable that the unreacted monomer is eliminated by heating optionally under reduced pressure. This elimination step may be performed either before the step b1 as described above or before the step b2. Namely, the order may be appropriately determined by taking the overall efficiency into consideration. In case of diluting the polymer with a solvent in the step b, the unreacted monomer as described above may be eliminated together with the solvent by heating.

The process for producing a polymer according to the invention comprises the step a and the step b (the steps b1 and b2) as described above optionally together with the step c. As described above, a small amount of a solvent can be used in each step. However, it is desirable from the viewpoints of environmental protection and safety in working that no solvent is employed in any of the above-described steps. The process of the invention is characterized in that the solvent-free treatment can be easily embodied. In the step b1 as described above, it is desirable that the transition metal and its ligand insoluble in the polymer are eliminated with the use of a centrifuge. In the step b2 as described above, it is desirable that the transition metal and its ligand dissolved in the polymer are eliminated with the use of an ion exchange resin. It is further desirable that these elimination treatments are carried out without resort to any solvent.

The polymer thus obtained, which is contaminated with little impurities, is usable as a base polymer in films, adhesives, pressure-sensitive adhesives, molded articles, surface-coating agents, coatings and the like. In such a case, the polymer may contain various additive components appropriate for the purpose, for example, tackifier resins, softeners, fillers, ultraviolet absorbers, antioxidants, pigments, etc. The polymer contaminated with little impurities as described above is also usable in the field of additives such as compatibilizing agents, softeners, dispersants and tackifier resins. Moreover, it is usable in mold release agents and release agents (or backside treatment agents) To apply to these various uses, the above-described polymer may be employed as such without crosslinking. Alternatively, the polymer may be subjected to a crosslinking treatment so as to make it chain extension and crosslinking at the same time. Thus, a crosslinked polymer having an extended molecular chain length, which is improved in the heat resistance and solvent resistance, can be obtained.

The crosslinking treatment may be carried out by using various publicly known methods. As described above, it is favorable to employ a chemical crosslinking method wherein a functional group (in particular, hydroxyl group) is preliminarily introduced into the polymer and then a crosslinking agent reacting therewith is added. As the crosslinking agent to be used herein, polyisocyanate compounds (optionally in the form of block compounds which are activated by heating or ultraviolet irradiation) easily reacting with hydroxyl group and polyfunctional acid anhydrides such as pyromellitic anhydride. Alternatively, cationic crosslinkage with the use of an acid catalyst may be carried out by adding an epoxy compound as a crosslinking aid. It is particularly preferable to employ a method wherein an onium salt-type phtoto-acid generating agent capable of generating an acid catalyst under ultraviolet irradiation is added, and the mixture is applied to a backing and then irradiated with ultraviolet so as to induce a crosslinking reaction. It is also possible to employ the method of using a trichloromethyl-containing triazine derivative and effecting a crosslinking reaction under ultraviolet irradiation, or the crosslinking method with the use of a radical-generating agent.

Since the amounts of the transition metal and its ligand contained in the polymer as impurities are largely reduced (in particular, regulated each to 30 ppm or less) in the invention even in the case of carrying out crosslinking treatment, there is no fear that the crosslinking reaction might be interfered as in the conventional case. Thus, the crosslinking method of any type can be efficiently performed and thus sufficient crosslinking can be achieved, thereby giving a polymer having improved properties.

In case of using the above-described polymer contaminated with little impurities as a base polymer of a pressure-sensitive adhesive composition in the invention, a polymer being tacky at room temperature is selected as the above polymer, as described above. In particular, the pressure-sensitive adhesive composition may be prepared by selecting, as the main component, a block copolymer being tacky at room temperature which is composed of at least two blocks of a non-elastomeric polymer block A having a glass transition temperature of 20° C. or above and an elastomeric polymer block B comprising a (meth)acrylate polymer bonded thereto (in particular, a block copolymer of the A-B type, the A-B-A type or the B-A-B type), and adding thereto various additive components as described above, if necessary.

In case where this pressure-sensitive adhesive composition is an uncrosslinked one of the hot-melt type, it is heated to thereby lower the viscosity and then applied to a backing. When it is to be crosslinked, the pressure-sensitive adhesive composition is applied to a backing as in the above case and then subjected to a crosslinking treatment as described above. Thus, it is possible to produce adhesive sheets in the form of tapes or sheets having pressure-sensitive adhesive layer(s) (thickness: usually from 10 to 100 μm on one face) on one or both of the backing surfaces. As the backing as described above, use may be made of those publicly in the art, for example, various plastic films, papers, films and papers with release treatment, laminated papers, metallic foils, foamed sheets and the like.

In case of using the above-described polymer contaminated with little impurities in film-forming materials or coatings in the invention, it is desirable to use, as the above-described polymer, a block copolymer composed of at least two blocks of a polymer block A having a Tg of 0° C. or above and a (meth)acrylate polymer block B having a Tg of lower than 0° C. bonded thereto, in particular, a block copolymer of the A-B type, the A-B-A type or the B-A-B type. Film-forming materials can be prepared by using the above-described block copolymer as the main material and blending therewith various additives publicly known in the art, if needed. On the other hand, coating compositions can be prepared by using the above-described block copolymer as the main component and blending therewith various additives publicly known in the art, if needed.

Now, the invention will be illustrated in greater detail by reference to the following Examples wherein all parts are by weight.

EXAMPLE 1

Into a four-necked flask provided with a mechanical stirrer, a nitrogen inlet, a cooling condenser and a rubber septum, 45.5 g (438 mmol) of styrene was introduced and then 2.05 g (13.1 mmol) of 2,2'-bipyridine was added thereto. After purging the inside of the system with nitrogen, 626 mg (4.36 mmol) of copper bromide was added thereto in nitrogen atmosphere. Then the reaction system was heated to 90° C. and 923 mg (4.37 mmol) of 2-hydroxyethyl 2-bromo-2-methylpropionate was added thereto as a polymerization initiator, thereby initiating the polymerization. The polymerization was carried out in nitrogen atmosphere at 90° C. for 12 hours with no solvent. After confirming that the conversion (the value calculated by dividing (the weight of the polymer after eliminating volatile component by heating) by (the weight of the polymer solution as such before eliminating the volatile components); the same will apply hereinafter) had attained 80% by weight or above, 182 g (1,420 mmol) of n-butyl acrylate was added form the rubber septum and the resultant mixture was heated for additional 20 hours. After confirming that the conversion had attained 80% by weight or above again, 1.13 g (6.56 mmol) of 6-hydroxyhexyl acrylate was added to the polymerization system and then the polymerization was carried out for 20 hours.

After the completion of the polymerization, the polymerization product was diluted with ethyl acetate to give a concentration of about 20% by weight. The viscosity at this point was 0.2 Pa·s. After filtering, a transparent and green polymer solution was obtained. To this solution was added 23 g of a sulfonic acid type cation exchange resin as an ion exchange resin. After stirring the mixture for 2 hours at room temperature, the above-described ion exchange resin was filtered off to give a colorless and transparent polymer solution. Finally, the ethyl acetate was distilled off from this solution and the residue was heated (60° C.) under reduced pressure, thereby forming a block copolymer of the A-B type having hydroxyl groups at both ends of the molecule. This block copolymer had a number-average molecular weight of 47,000 and contained 4.6 ppm of copper (determined by dissolving in conc. sulfuric acid and conc. nitric acid and subjecting to ion chromatography) and 3.8 ppm of bipyridine (determined by dissolving in toluene and subjecting to gas chromatography).

Next, a pressure-sensitive adhesive composition was prepared by blending 100 parts of this block copolymer with 3 parts of an epoxy compound (4-epxycyclohexylmethyl-3', 4'-epoxycyclohexylcarboxylate) employed as a crosslinking aid and 2 parts of phenyl-(3-hydroxypentadecylphenyl) iodonium·hexafluoroantimonate capable of generating an acid catalyst inducing a cation reaction when irradiated with ultraviolet. Then the obtained composition was applied to a polyester film employed as a backing in such a manner as to give a coating thickness after drying of 50 μm. Subsequently, it was ultraviolet-irradiated with a high-pressure mercury lamp at a dosage of 1,500 mJ/cm$^2$ and then heated at 120° C. for 5 minutes to thereby give an adhesive sheet having been sufficiently crosslinked.

Comparative Example 1

A block copolymer of the A-B type having hydroxyl groups at both ends of the molecule was obtained as in Example 1 but omitting the treatment with the ion exchange resin. When determined as in Example 1, it was found out that this block copolymer contained 9.3 ppm of copper and 2,200 ppm of bipyridine. Then a pressure-sensitive adhesive composition was prepared as in Example 1 but using this block copolymer. Then it was attempted to produce an adhesive sheet as in Example 1 but using this pressure-sensitive adhesive composition. However, it was impossible to produce any practically usable adhesive sheet thereby, since the crosslinking reaction could not proceed smoothly and thus the composition remained uncured and the sheet could not retain even its shape.

EXAMPLE 2

Into a four-necked flask provided with a mechanical stirrer, a nitrogen inlet, a cooling condenser and a rubber septum, 14.2 g (137 mmol) of styrene was introduced and then 1.3 g (8.3 mmol) of 2,2'-bipyridine was added thereto. After purging the inside of the system with nitrogen, 410 mg (2.84 mmol) of copper bromide was added thereto in nitrogen atmosphere. Then the reaction system was heated to 90° C. and 600 mg (2.84 mmol) of 2-hydroxyethyl 2-bromo-2-methylpropionate was added thereto as a polymerization initiator, thereby initiating the polymerization. The polymerization was carried out in nitrogen atmosphere at 90° C. for 12 hours with no solvent. After confirming that the conversion had attained 80% by weight or above, 182 g (1,420 mmol) of 2-ethylhexyl acrylate was added from the rubber septum and the resultant mixture was heated to 110° C. for additional 20 hours. After confirming that the conversion had attained 80% by weight or above again, 740 mg (4.28 mmol) of 6-hydroxyhexyl acrylate was added and then the polymerization was carried out for 16 hours. Finally, 14.2 g (137 mmol) of styrene was added to from the rubber septum the polymerization system and the resultant mixture was heated to 90° C. for 20 hours.

After the completion of the polymerization, the polymerization product was heated to 120° C. The viscosity at this point was 80 Pa·s. Then it was centrifuged at a centrifugal force of 20,000 g for 1 hour to give a polymerization product (green) as the supernatant. To 100 g of this polymerization product was added 10 g of a sulfonic acid type cation exchange resin as an ion exchange resin. After stirring the mixture at 120° C. for 2 hours, the above-described ion exchange resin was filtered off to give a colorless and transparent polymer which was a block copolymer of the A-B-A type having hydroxyl groups at both ends of the molecule. This block copolymer had a number-average molecular weight of 51,000 and contained 6.9 ppm of copper and 8.2 ppm of bipyridine each determined as in Example 1. Next, a pressure-sensitive adhesive composition was prepared as in Example 1 but using this block copolymer. Further, a sufficiently crosslinked adhesive sheet was prepared as in Example 1 but using this composition.

Comparative Example 2

A block copolymer of the A-B-A type having hydroxyl groups at both ends of the molecule was obtained as in Example 2 but omitting the treatment with the ion exchange resin. When determined as in Example 1, it was found out that this block copolymer contained 33 ppm of copper and 3,150 ppm of bipyridine. Then a pressure-sensitive adhesive composition was prepared as in Example 1 but using this block copolymer. Then it was attempted to produce an adhesive sheet as in Example 1 but using this pressure-sensitive adhesive composition. However, it was impossible to produce any practically usable adhesive sheet thereby, since the crosslinking reaction could not proceed smoothly and thus the composition remained uncured and the sheet could not retain even its shape.

The adhesive sheets of Examples 1 and 2 as described above were subjected to the measurement of adhesion and holding power by the following methods. Table 1 summarizes the results.

<Adhesion Test>

An adhesive sheet was cut into a piece of 20 mm in width and 100 mm in length. Then it was contact-bonded to a stainless plate employed as an adherend, which had been abraded with a #280 sandpaper, by pressing with a roller (2 kg) back and forth. After allowing to stand at 23° C. for 20 minutes, the force required in peeling (180° peeling) was measured at a tensile speed of 300 mm/min in an atmosphere at 23° C. under 65% RH.

<Holding Power Test>

An adhesive sheet was adhered to a phenol resin plate at an adhesion area of 10 mm in width and 20 mm in length. After allowing to stand for 20 minutes, it was allowed to stand at 40° C. for additional 20 minutes. Then the phenol resin plate was hung over while applying a uniform load (500 g) of the fee end of the adhesive sheet. Then the time (minutes) till the adhesive sheet dropped was measured at 40° C.

TABLE 1

|  | Adhesion test (N/20 mm width) | Holding power test (min) |
| --- | --- | --- |
| Example 1 | 8.7 | >120 |
| Example 2 | 7.5 | >120 |

As the results given in the above Table 1 clearly show, the adhesive sheets of Examples 1 and 2 according to the invention both show excellent adhesion properties with highly satisfying the adhesion and the cohesion (holding power) owing to the sufficient crosslinking effects. When the surface of the stainless plate employed as the adherend was observed after the adhesion test as described above, it was found out that the adherend surface was scarcely stained.

EXAMPLE 3

Into a four-necked flask provided with a mechanical stirrer, a nitrogen inlet, a cooling condenser and a rubber septum, 100 g of n-butyl acrylate was introduced and then 1 g of 2,2'-bipyridine was added thereto. After purging the inside of the system with nitrogen, 0.3 g of copper bromide was added thereto in nitrogen atmosphere. Then the reaction system was heated to 100° C. and 0.4 g of a polymerization initiator (2-hydroxyethyl 2-bromo-2-methylpropionate) was added thereto, thereby initiating the polymerization. The polymerization was carried out in nitrogen atmosphere at 100° C. for 12 hours with no solvent. After confirming that the conversion had attained 80% by weight or above, 100 g of methyl methacrylate was added from the rubber septum and the resultant mixture was heated for additional 8 hours. After confirming that the conversion had attained 80% by weight or above again, 0.55 g of 6-hydroxyhexyl acrylate was added and then the resultant mixture was heated for 20 hours.

Thus a diblock copolymer of the A-B type composed of the methyl methacrylate polymer block A and the n-butyl acrylate polymer block B and having hydroxyl groups at both ends of the molecule was obtained. Then this polymer was diluted with ethyl acetate to give a concentration of about 20% by weight. The viscosity at this point was 1 Pa·s. Then it was filtered to give a transparent and green polymer solution. To this solution was added 23 g of a sulfonic acid type cation exchange resin as an ion exchange resin. After stirring the mixture at room temperature for 2 hours, the above-described ion exchange resin was filtered off to give a colorless and transparent polymer solution. After distilling off the ethyl acetate from this solution, the residue was heated (60° C.) under reduced pressure to give the above-described copolymer having hydroxyl groups at both ends of the molecule. This copolymer had a number-average molecular weight of 105,000 and contained 5.8 ppm of copper and 4.8 ppm of bipyridine each determined as in Example 1.

After the completion of the above-described treatment with the ion exchange resin, the colorless and transparent polymer solution was applied on a release paper in such a manner as to give a thickness after drying of 50 μm and then heated at 100° C. for 5 minutes to thereby give a film. This film was free from any coloration and showed a large breaking strength of 17.5 N/mm².

Comparative Example 3

The polymer solution prior to the treatment with the ion exchange resin in Example 3 (i. e., the transparent and green polymer solution) was employed as such. When determined as in Example 1, it was found out that this polymer contained 18 ppm of copper and 3,100 ppm of bipyridine. By using this polymer solution, a film was produced as in Example 3. The obtained film was somewhat colored in green and showed a small breaking strength of 12.3 N/mm².

EXAMPLE 4

Into a four-necked flask provided with a mechanical stirrer, a nitrogen inlet, a cooling condenser and a rubber septum, 70 g of n-butyl acrylate and 70 g of ethyl acrylate were introduced and then 1.9 g of 2,2'-bipyridine was further added thereto. After purging the inside of the system with nitrogen, 0.56 g of copper bromide was added thereto in nitrogen atmosphere. Then the reaction system was heated to 100° C. and 0.85 g of a polymerization initiator (2-hydroxyethyl 2-bromo-2-methylpropionate) was added thereto, thereby initiating the polymerization. The polymerization was carried out in nitrogen atmosphere at 100° C. for 12 hours with no solvent. After confirming that the conversion had attained 80% by weight or above, 60 g of methyl methacrylate was added from the rubber septum and the resultant mixture was heated to 80° C. for additional 8 hours. After confirming that the conversion had attained 80% by weight or above again, 0.74 g of 6-hydroxyhexyl acrylate was added and then polymerization was carried out for 20 hours.

Thus a diblock copolymer of the A-B type composed of the methyl methacrylate polymer block A and the random polymer block B of n-butyl acrylate with ethyl acrylate and having hydroxyl groups at both ends of the molecule was obtained. Then this copolymer was heated to 150° C. The viscosity at this point was 72 Pa·s. Then it was centrifuged at a centrifugal force of 20,000 g for 1 hour to give a polymer (green) as the supernatant. To 100 g of this polymer was added 10 g of a sulfonic acid type cation exchange resin as an ion exchange resin. After stirring the mixture at 150° C. for 2 hours, the above-described ion exchange resin was filtered off to give a colorless and transparent polymer (i.e., the above-described diblock copolymer of the A-B type). This polymer had a number-average molecular weight of 55,000 and contained 8.7 ppm of copper and 7.8 ppm of bipyridine each determined as in Example 1.

After the completion of the above-described treatment with the ion exchange resin, the colorless and transparent polymer was diluted with ethyl acetate to give a concentration of 20% by weight. The polymer solution thus obtained was applied to an SUS340 plate and stored in an atmosphere at 50° C. under 90% RH for 2 weeks. Then the coating film was peeled off. As a result, the surface of the SUS340 plate was free from any coloration due to stain.

Comparative Example 4

The polymer prior to the treatment with the ion exchange resin in Example 4 (i.e., the transparent and green polymer having been centrifuged) was employed as such. When determined as in Example 1, it was found out that this polymer contained 86 ppm of copper and 4,600 ppm of bipyridine. Subsequently, this polymer was applied to an SUS340 plate as in Example 4. After storing in an atmosphere at 50° C. under 90% RH for 2 weeks, the coating film was peeled off. As a result, the surface of the SUS340 plate was obviously colored into red due to stain.

EXAMPLE 5

Into a four-necked flask provided with a mechanical stirrer, a nitrogen inlet, a cooling condenser and a rubber septum, 100 g of n-butyl acrylate was introduced and then 1 g of 2,2'-bipyridine was further added thereto. After purging the inside of the system with nitrogen, 0.3 g of copper bromide was added thereto in nitrogen atmosphere. Then the reaction system was heated to 100° C. and 0.4 g of a polymerization initiator (2-hydroxyethyl 2-bromo-2-methylpropionate) was added thereto, thereby initiating the polymerization. The polymerization was carried out in nitrogen atmosphere at 100° C. for 12 hours with no solvent. After confirming that the conversion had attained 80% by weight or above, 100 g of isobornyl acrylate was added from the rubber septum and the resultant mixture was heated to 70° C. for additional 8 hours. After confirming that the conversion had attained 80% by weight or above again, 0.55 g of 6-hydroxyhexyl acrylate was added and then polymerization was carried out for 20 hours.

Thus a diblock copolymer of the A-B type composed of the isobornyl acrylate polymer block A and the n-butyl acrylate polymer block B and having hydroxyl groups at both ends of the molecule was obtained. Then this copolymer was diluted with ethyl acetate to give a concentration of about 20% by weight. The viscosity at this point was 0.8 Pa·s. Then it was filtered to give a transparent and green polymer solution. To this polymer solution was added 23 g of a sulfonic acid type cation exchange resin as an ion exchange resin. After stirring the mixture at room temperature for 2 hours, the above-described ion exchange resin was filtered off to give a colorless and transparent polymer solution. Next, the ethyl acetate was distilled off form this solution and the residue was heated to 60° C. under reduced pressure to give the above-described copolymer having hydroxyl groups at both ends of the molecule. This copolymer had a number-average molecular weight of 105,000 and contained 7.8 ppm of copper and 5.5 ppm of bipyridine each determined as in Example 1.

After the completion of the above-described treatment with the ion exchange resin, the colorless and transparent polymer solution thus obtained was applied to an SUS340 plate and stored in an atmosphere at 50° C. under 90% RH for 2 weeks. Then the coating film was peeled off. As a result, the surface of the SUS340 plate was free from any coloration due to stain.

Comparative Example 5

The polymer solution prior to the treatment with the ion exchange resin in Example 5 (i.e., the transparent and green polymer solution) was employed as such. When determined as in Example 1, it was found out that this polymer contained 32 ppm of copper and 4,400 ppm of bipyridine. Subsequently, this polymer was applied to an SUS340 plate as in Example 5. After storing in an atmosphere at 50° C. under 90% RH for 2 weeks, the coating film was peeled off As a result, the surface of the SUS340 plate was obviously colored into red due to stain.

EXAMPLE 6

Into a four-necked flask provided with a mechanical stirrer, a nitrogen inlet, a cooling condenser and a rubber septum, 14.2 g of styrene was introduced and then 1.3 g of 2,2'-bipyridine was further added thereto. After purging the inside of the system with nitrogen, 0.41 g of copper bromide was added thereto in nitrogen atmosphere. Then the reaction system was heated to 90° C. and 0.6 g of a polymerization initiator (2-hydroxyethyl 2-bromo-2-methylpropionate) was added thereto, thereby initiating the polymerization. The polymerization was carried out in nitrogen atmosphere at 90° C. for 12 hours with no solvent. After confirming that the conversion had attained 80% by weight or above, 182 g of n-butyl acrylate was added from the rubber septum and the resultant mixture was heated to 110° C. for 20 hours. After confirming that the conversion had attained 80% by weight or above again, 0.74 g of 6-hydroxyhexyl acrylate was added and then polymerization was carried out for 20 hours. Finally, 14.2 g of styrene was added from the rubber septum and the resultant mixture was heated to 90° C. for 20 hours.

Thus a triblock copolymer of the A-B-A type composed of the styrene polymer block A and the n-butyl acrylate polymer block B and having hydroxyl groups at both ends of the molecule was obtained. Then this copolymer was heated to 120° C. The viscosity at this point was 84 Pa·s. Then it was centrifuged at a centrifugal force of 20,000 g for 1 hour to give a polymer (green) as the supernatant. To 100 g of this polymer was added 10 g of a sulfonic acid type cation exchange resin as an ion exchange resin. After stirring the mixture at 120° C. for 2 hours, the above-described ion exchange resin was filtered off to give a colorless and transparent polymer (i.e., the above-described triblock copolymer of the A-B-A type). This polymer had a number-average molecular weight of 58,000 and contained 8.5 ppm of copper and 8.7 ppm of bipyridine each determined as in Example 1.

Next, a composition for crosslinkage was prepared by blending 100 parts of this polymer, which had been treated with the above-described ion exchange resin, with 3 parts of an epoxy compound (4-epxycyclohexylmethyl-3',4'-epoxycyclohexylcarboxylate) employed as a crosslinking aid and 2 parts of phenyl(3-hydroxypentadecylphenyl) iodonium hexafluoroantimonate capable of generating an acid inducing a cation reaction when irradiated with ultraviolet. Then the obtained composition was applied to a polyester film in such a manner as to give a thickness of 50 μm. Subsequently, it was ultraviolet-irradiated with a high-pressure mercury lamp at a dosage of 1,500 mJ/cm² and then heated at 120° C. for 5 minutes. Thus, the above-described polymer could be sufficiently cured (crosslinked).

Comparative Example 6

The polymer prior to the treatment with the ion exchange resin in Example 6 (i.e., the green polymer obtained as the supernatant after centrifugation) was employed as such. When determined as in Example 1, it was found out that this polymer contained 60 ppm of copper and 3,450 ppm of bipyridine. Subsequently, a composition was prepared as in Example 6 but using this polymer. The obtained composition was subjected to application, ultraviolet-irradiation and heating as in Example 6. As a result, the above-described polymer was not cured and could not retain its shape. This is because the bipyridine remaining in the polymer inhibited the crosslinking reaction.

EXAMPLE 7

Into a four-necked flask provided with a mechanical stirrer, a nitrogen inlet, a cooling condenser and a rubber septum, 42 g of styrene was introduced and then 1.6 g of 2,2'-bipyridine was further added thereto. After purging the inside of the system with nitrogen, 0.5 g of copper bromide was added thereto in nitrogen atmosphere. Then the reaction system was heated to 90° C. and 0.74 g of a polymerization initiator (2-hydroxyethyl 2-bromo-2-methylpropionate) was added thereto, thereby initiating the polymerization. The polymerization was carried out in nitrogen atmosphere at 90° C. for 12 hours with no solvent. After confirming that the conversion had attained 80% by weight or above, 126 g of 2-ethylhexyl acrylate was added from the rubber septum and the resultant mixture was heated to 110° C. for 20 hours. After confirming that the conversion had attained 80% by weight or above again, 0.91 g of 6-hydroxyhexyl acrylate was added and then polymerization was carried out for 20 hours. Finally, 42 g of styrene was added from the rubber septum and the resultant mixture was heated to 90° C. for 20 hours.

Thus a triblock copolymer of the A-B-A type composed of the styrene polymer block A and the 2-ethylhexyl acrylate polymer block B and having hydroxyl groups at both ends of the molecule was obtained. Then this copolymer was heated to 150° C. The viscosity at this point was 65 Pa·s. Then it was centrifuged at a centrifugal force of 20,000 g for 1 hour to give a polymer (green) as the supernatant. To 100 g of this polymer was added 5 g of a sulfonic acid type cation exchange resin as an ion exchange resin. After stirring the mixture at 150° C. for 0.5 hours, the above-described ion exchange resin was filtered off. Next, 5 g of zeolite was added and the obtained mixture was stirred at 150° C. for 0.5 hours. After filtering off the above-described zeolite, 5 g of the sulfonic acid type cation exchange resin was finally added and the mixture was stirred at 150° C. for 0.5 hours.

Then the above-described ion exchange resin was filtered off to give a colorless and transparent polymer (i.e., the above-described triblock copolymer of the A-B-A type). This polymer had a number-average molecular weight of 49,000 and contained 4.8 ppm of copper and 5.3 ppm of bipyridine each determined as in Example 1.

Next, a composition was prepared as in Example 6 but using this polymer having been treated with the above-described ion exchange resin. This composition was subjected successively to application, ultraviolet-irradiation and heating as in Example 6. As a result, the above-described polymer could be sufficiently cured (crosslinked).

Comparative Example 7

The polymer prior to the treatment with the ion exchange resin and zeolite in Example 7 (i.e., the polymer (green) obtained as the supernatant after centrifugation) was employed as such. When determined as in Example 1, it was found out that this polymer contained 120 ppm of copper and 4,680 ppm of bipyridine. Subsequently, a composition was prepared as in Example 6 but using this polymer. The obtained composition was subjected successively to application, ultraviolet-irradiation and heating as in Example 6. As a result, the above-described polymer was not cured and could not retain its shape. This is because the bipyridine remaining in the polymer inhibited the crosslinking reaction.

EXAMPLE 8

Into a four-necked flask provided with a mechanical stirrer, a nitrogen inlet, a cooling condenser and a rubber septum, 50 g of cyclohexyl acrylate was introduced and then 4.6 g of 2,2'-bipyridine was further added thereto. After purging the inside of the system with nitrogen, 2.2 g of copper bromide was added thereto in nitrogen atmosphere. Then the reaction system was heated to 90° C. and 3.24 g of a polymerization initiator (ethyl 2-bromoisobutyrate) was added thereto, thereby initiating the polymerization. The polymerization was carried out in nitrogen atmosphere at 90° C. for 6 hours with no solvent. After confirming that the conversion had attained 85% by weight or above, 17 g of n-butyl acrylate was added from the rubber septum and the resultant mixture was heated to 110° C. for 10 hours.

Thus a diblock copolymer of the A-B type composed of the cyclohexyl acrylate polymer block A and the n-butyl acrylate polymer block B was obtained. Then this copolymer was heated to 100° C. The viscosity at this point was 5 Pa·s. Then it was centrifuged at a centrifugal force of 8,000 g for 30 minutes to give a polymer as the supernatant. To 50 g of this polymer was added 10 g of a sulfonic acid type ion exchange resin. After stirring the mixture at 100° C. for 1 hour, the ion exchange resin was filtered off to give a colorless and transparent polymer. This polymer had a number-average molecular weight of 4,200 and contained 3.6 ppm of copper and 6.9 ppm of bipyridine each determined as in Example 1.

Next, this polymer was employed as a tackifier resin. To 100 parts of the block copolymer of Example 1 was added 20 parts of the above-described tackifier resin and the obtained mixture was treated as in Example 1 to give an adhesive sheet. This adhesive sheet had been sufficiently crosslinked and showed an adhesion of 13.5 N/20 mm width and a holding power of 120 minutes or longer.

Comparative Example 8

The procedure of Example 8 was followed but treating the polymer (block copolymer) with the ion exchange resin without centrifuging. As a result, the polymer thus treated contained solid matters and colored. Namely, no polymer with favorable appearance could be obtained thereby.

Comparative Example 9

The procedure of Example 8 was followed but omitting the treatment with the ion exchange resin after centrifuging the polymer (block copolymer). As a result, the obtained polymer contained 300 ppm of copper bromide and 60,000 ppm of bipyridine when determined as in Example 1. Next, this polymer was employed as a tackifier resin. To 100 parts of the block copolymer of Example 1 was added 20 parts of the above-described tackifier resin and an adhesive sheet was produced as in Example 1. However, no crosslinkage could be performed and it was impossible to achieve any satisfactory adhesive properties.

In the process according to the invention as discussed above, a polymer is formed by the living radical polymerization and then a transition metal and its ligand employed as a polymerization activator are eliminated therefrom while regulating the viscosity of the polymerization reaction product to a definite level or below. In particular, this elimination procedure is performed in two steps including the former step of eliminating the transition metal and its ligand insoluble in the polymer and the latter step of eliminating the transition metal and its ligand dissolved in the polymer and a centrifuge and an ion exchange resin are employed respectively in the former step and in the latter step. It is therefore possible to easily produce a polymer, which is contaminated with little impurities and free from the troubles of the coloration and the decrease in the mechanical properties of molded articles (films, etc.), crosslinkage failure, migration (stain) or the like, without using a large amount of a solvent as in the conventional cases or considerably lowering the yield of the polymer.

While the invention has been described in detail and with reference to specific embodiments thereof, it will be apparent to one skilled in the art that various changes and modifications can be made therein without departing from the spirit and scope thereof.

What is claimed is:

1. A process for producing a polymer comprising: a) the step of performing a polymerization reaction by using a monomer, a transition metal and its ligand and a polymerization initiator to form a polymer; and b) the step of eliminating the transition metal and its ligand contained in the polymer under the condition of a viscosity of 100 Pa·s or below, wherein said step b comprises: b1) the former step of eliminating the transition metal and its ligand insoluble in the polymer by using a centrifuge; and b2) the latter step of eliminating the transition metal and its ligand dissolved in the polymer.

2. The process for producing a polymer as claimed in claim 1 which further comprises c) the step of eliminating unreacted monomer after the step a, in addition to the step b.

3. The process for producing a polymer as claimed in claim 1, wherein the combination of said transition metal and its ligand is a $Cu^{+1}$-bipyridine complex.

4. The process for producing a polymer as claimed in claim 1, wherein the step b2 comprises the step of eliminating the transition metal and its ligand dissolved in the polymer with the use of an ion exchange resin.

5. A process for producing a polymer as claimed in any of claims 1 to 3, wherein no solvent is employed in any step.

6. A process for producing a polymer as claimed in claim 1, wherein the content of the transition metal and its ligand in the polymer is regulated to 30 ppm or below.

7. A process for producing a polymer as claimed in claim 1, wherein the number-average molecular weight of said polymer ranges from 3,000 to 300,000.

8. A process for producing a polymer as claimed in claim 1, wherein said polymer is a block copolymer of the A-B type, the A-B-A type or the A-B-C type.

9. A process for producing a polymer as claimed in claim 1, wherein said polymer is a block copolymer being tacky at room temperature which is composed of at least two blocks of a non-elastomeric polymer block A having a glass transition temperature of 20° C. or above and an elastomeric polymer block B comprising a (meth)acrylate polymer bonded thereto.

10. A pressure-sensitive adhesive composition comprising, as the main component, a block copolymer of the A-B type, the A-B-A type or the B-A-B type being tacky at room temperature, which is produced by a process for producing the polymer comprising: a) the step of performing a polymerization reaction by using a monomer, a transition metal and its ligand and a polymerization initiator to form the polymer; and b) the step of eliminating the transition metal and its ligand contained in the polymer under the condition of a viscosity of 100 Pa·s or below, wherein said step b comprises: b1) the former step of eliminating the transition metal and its ligand insoluble in the polymer by using a centrifuge; and b2) the latter step of eliminating the transition metal and its ligand dissolved in the polymer, wherein said polymer is a block copolymer being tacky at room temperature which is composed of at least two blocks of a non-elastomeric polymer block A having a glass transition temperature of 20° C. or above and an elastomeric polymer block B comprising a (meth)acrylate polymer bonded thereto.

11. A process for producing a polymer as claimed in claim 1, wherein said polymer is a block copolymer composed of at least two blocks of a polymer block A having a glass transition temperature of 0° C. or above and a (meth)acrylate polymer block B having a glass transition temperature of lower than 0° C. bonded thereto.

12. A film-forming material comprising, as the main component, a block copolymer of the A-B type, the A-B-A type or the B-A-B type, which is produced by a process for producing the polymer comprising: a) the step of performing a polymerization reaction by using a monomer, a transition metal and its ligand and a polymerization initiator to form the polymer; and b) the step of eliminating the transition metal and its ligand contained in the polymer under the condition of a viscosity of 100 Pa·s or below, wherein said step b comprises: b1) the former step of eliminating the transition metal and its ligand insoluble in the polymer by using a centrifuge; and b2) the latter step of eliminating the transition metal and its ligand dissolved in the polymer, wherein said polymer is a block copolymer composed of at least two blocks of a polymer block A having a glass transition temperature of 0° C. or above and a (meth)acrylate polymer block B having a glass transition temperature of lower than 0° C. bonded thereto.

13. A coating composition comprising, as the main component, a block copolymer of the A-B type, the A-B-A type or the B-A-B type, which is produced by a process for producing the polymer comprising: a) the step of performing a polymerization reaction by using a monomer, a transition metal and its ligand and a polymerization initiator to form the polymer; and b) the step of eliminating the transition metal and its ligand contained in the polymer under the condition of a viscosity of 100 Pa·s or below, wherein said step b comprises: b1) the former step of eliminating the transition metal and its ligand insoluble in the polymer by using a centrifuge; and b2) the latter step of eliminating the transition metal and its ligand dissolved in the polymer, wherein said polymer is a block copolymer composed of at least two blocks of a polymer block A having a glass transition temperature of 0° C. or above and a (meth)acrylate polymer block B having a glass transition temperature of lower than 0° C. bonded thereto.

* * * * *